United States Patent
Downor (10) Patent No.: US 9,311,810 B2
(45) Date of Patent: Apr. 12, 2016

(54) IMPLEMENTING STANDARDIZED BEHAVIORS IN A HOSTING DEVICE

(71) Applicant: General Electric Company, Schenectady, NY (US)

(72) Inventor: Johnny Downor, Salem, VA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 39 days.

(21) Appl. No.: 14/162,499

(22) Filed: Jan. 23, 2014

(65) Prior Publication Data

US 2015/0205268 A1 Jul. 23, 2015

(51) Int. Cl.
| | |
|---|---|
| G08B 26/00 | (2006.01) |
| G08B 25/00 | (2006.01) |
| G08B 21/18 | (2006.01) |
| G08B 5/22 | (2006.01) |
| G05B 19/042 | (2006.01) |
| G05B 23/02 | (2006.01) |

(52) U.S. Cl.
CPC .......... *G08B 25/008* (2013.01); *G05B 19/0425* (2013.01); *G05B 23/0272* (2013.01); *G08B 5/22* (2013.01); *G08B 21/18* (2013.01); *G08B 25/001* (2013.01)

(58) Field of Classification Search
CPC ............... G06Q 50/06; G05B 19/4185; G05B 19/0426; G05B 19/0425; G05B 19/41865; G05B 23/0216; G05B 23/027; G06F 19/3418; F04B 41/06; G08B 21/18
USPC ................. 340/573.1, 540, 539.16, 517, 500, 340/691.1; 700/83, 282, 17, 287, 80, 12; 701/117, 1; 702/188
See application file for complete search history.

(56) References Cited

U.S. PATENT DOCUMENTS

| | | | | |
|---|---|---|---|---|
| 6,289,332 | B2* | 9/2001 | Menig et al. ................... | 180/167 |
| 6,643,555 | B1* | 11/2003 | Eller et al. ...................... | 700/83 |
| 8,019,529 | B1* | 9/2011 | Sharma et al. ................ | 701/117 |
| 8,937,555 | B2* | 1/2015 | Karaffa ............. | G05B 19/0425 340/635 |
| 2001/0012976 | A1* | 8/2001 | Menig et al. ...................... | 701/1 |
| 2002/0163427 | A1* | 11/2002 | Eryurek ............... | G05B 23/027 340/500 |
| 2003/0014500 | A1* | 1/2003 | Schleiss et al. ............... | 709/218 |
| 2004/0024572 | A1* | 2/2004 | Pagnano ............ | G05B 19/0425 702/188 |
| 2005/0012608 | A1* | 1/2005 | Havekost ........... | G05B 23/0272 340/517 |
| 2008/0255681 | A1* | 10/2008 | Scott ................... | G05B 23/0216 700/12 |
| 2009/0277374 | A1* | 11/2009 | Schie ..................... | B65D 90/50 116/109 |
| 2011/0273288 | A1* | 11/2011 | Kochan et al. ................ | 340/540 |
| 2011/0291837 | A1* | 12/2011 | Rantala ....................... | 340/573.1 |
| 2012/0062383 | A1* | 3/2012 | Bhargva et al. ............ | 340/573.1 |
| 2012/0310380 | A1* | 12/2012 | Karaffa ............. | G05B 19/0425 700/80 |
| 2012/0310383 | A1* | 12/2012 | Karaffa ............ | G05B 19/41865 700/80 |

(Continued)

FOREIGN PATENT DOCUMENTS

WO 2004111785 A3 12/2004

*Primary Examiner* — Hoi Lau
(74) *Attorney, Agent, or Firm* — GE Global Patent Operation (57) ABSTRACT

A system includes a standard functionality hosting device. The hosting device includes standard functionality hosting logic that includes machine-readable instructions stored on a tangible, non-transitory machine-readable medium configured to implement, control, or implement and control management functionalities defined by a standard, for one or more devices that are not independently enabled to implement, control, or implement and control the management functionalities. Further, the hosting device includes a processor configured to implement the alarm standard hosting logic.

1 Claim, 6 Drawing Sheets

(56) References Cited

U.S. PATENT DOCUMENTS

| | | | |
|---|---|---|---|
| 2013/0197700 A1* | 8/2013 | Kochan et al. | 700/282 |
| 2013/0297369 A1* | 11/2013 | Shook | 705/7.26 |
| 2015/0088281 A1* | 3/2015 | Downor | G05B 19/0425 700/80 |
| 2015/0205268 A1* | 7/2015 | Downor | G08B 21/18 340/517 |

* cited by examiner

IMPLEMENTING STANDARDIZED BEHAVIORS IN A HOSTING DEVICE

BACKGROUND

The subject matter disclosed herein relates to automation control system monitoring and alarms. Specifically, the current application relates to providing functionality described in certain standards (e.g., standards created by the International Society of Automation (ISA)) via a hosting device.

Certain systems, such automation control systems, may provide for control capabilities that enable the execution of control instructions in various types of devices, such as sensors, pumps, valves, and the like. Additionally, certain industrial control systems may include one or more graphical user interfaces that may be used to present details to an operator about the various devices present on the control system network. For example, a graphical user interface may present an operator with alerts that may contain alarm or diagnostic information about a device on the control system network.

Many standards are continually introduced to promote stability, predictability, and consistency across the automation control system. While these standards may present best practices across the automation control system, they oftentimes include grandfathering provisions that suggest that devices (e.g., sensors, pumps, valves, etc.) that cannot comply with other provisions in the standard are exempted and/or should be replaced. Unfortunately, replacing these devices may be burdensome, because of replacement time and costs. Further, exempting devices in a system where some of the devices are adhering to the standard may lead to unpredictability and confusion among system operators, because the compliant portions of the system may respond differently than non-compliant portions of the system. Accordingly, a system that removes these inconsistent behaviors is desirable.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a standard functionality hosting device. The hosting device includes standard functionality hosting logic that includes machine-readable instructions stored on a tangible, non-transitory machine-readable medium configured to implement, control, or implement and control management functionalities defined by a standard, for one or more devices that are not independently enabled to implement, control, or implement and control the management functionalities. Further, the hosting device includes a processor configured to implement the alarm standard hosting logic.

In a second embodiment, an industrial control system includes a device configured to provide one or more alarms upon the occurrence of one or more events. The system also includes a controller configured to receive the one or more alarms and provide the one or more alarms to an alarm server. The system includes the alarm server configured to receive and process the one or more alarms, an alarm viewer configured to display the one or more alarms that are provided by the alarm server, and a standard functionality hosting device configured to implement, control, or implement and control management functionalities defined by a standard implemented in the industrial control system, wherein the device is not independently enabled to implement, control, or implement and control the management functionalities.

In a third embodiment, a tangible, non-transitory, machine-readable medium, includes machine-readable instructions to: interpret one or more commands defining an application of one or more functionalities of International Society of Automation's (ISA's) 18.2 alarm management standard applied to one or more devices that are not independently enabled to implement the functionalities; and implement the one or more functionalities by modifying how or when one or more alarms of the one or more devices are presented, based upon the one or more commands.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Industrial control system standards provide practices and/or data/control expectancies among components of the control system. However, while components of a control system may independently adhere to certain control system standards, it may be impractical and/or difficult for the devices to independently adhere to all control system standards. For example, it may be hard to foresee standards that are defined after a control system component is already implemented.

In one example, the Foundation Fieldbus standard includes the concept of Foundation Fieldbus alerts, which are used by Foundation Fieldbus devices to inform a controller or other component of an industrial control system of events or alarms that devices may experience. The Foundation Fieldbus alert may include one or more parameters that include information about the alert. However, devices that are independently compliant with the Foundation Fieldbus standards may not be compliant with other industrial control system standards. For example, the International Society of Automation (ISA) has developed standards (e.g., the ISA 18.2 alarm management standard) that may result in a more productive plant (e.g., power plant). The Foundation Fieldbus standard may not mention adherence to the ISA standards, which may result in Foundation Fieldbus devices that are not independently compliant with the ISA standards (e.g., the ISA 18.2 standard).

The embodiments of the invention discussed below provide industrial control system standards (e.g., the ISA 18.2 standard) capabilities to devices that are not independently compliant with the standard (e.g., a Foundation Fieldbus or HART device). For example, the embodiments may include a hosting component that enables ISA 18.2 functionalities such as prioritization of alarms, alarm shelving, alarm suppression, and alarm out of service functionalities to non-independently compliant devices, such as Foundation Fieldbus devices. Alarm prioritization may relate to assigning a level of importance to one or more alarms. This may be useful to provide different actions and/or reporting of alarms based upon the assigned level of importance. Alarm shelving may enable an alarm to be temporarily placed out of service for a defined about of time and/or until a certain time. In some embodiments, the hosting device may include and/or communicate with a data store that aids in implementation of the standard functionality hosting. Further, embodiments include a graphical user interface that enables a user to initiate and/or review the standard functions in the industrial control system.

While a full range of standard-based functionalities may be hosted by the hosting device, the discussion will focus on certain alarm management standards provided by the ISA 18.2 standard. Namely, the hosting device will be described in terms of hosting a prioritization function, an alarm shelving function, alarm suppression functionality, and certain alarm configuration functionalities.

At any given time period during an active industrial control system, a multitude of alarms may be presented to a user/operator. The prioritization functions may enable a user/operator to define a severity level and/or level of importance of particular alarms and/or alarm types, such that the user/operator and/or other components (e.g., an HMI or alarm viewer) may prioritize one alarm over another. Accordingly, alarms may be sorted for the user/operator, allowing the user/operator to monitor/tend to the most important alarms first. As may be appreciated, if only certain alarms are enabled to allow prioritization (e.g., because certain devices are grandfathered into an exception around the standard), there may be inconsistencies in how alarms are presented to the user/operator. For example, non-prioritized alarms may be provided at the top or bottom of a list of alarms, without regard to priority.

Shelving functionalities may also be provided to devices that do not independently support such functionalities. Shelving enables a user/operator to disable an alarm for a temporary amount of time. The temporary amount of time may be fixed, or may be dynamic. For example, the temporary amount of time may be 5 minutes or may be variable based upon the criticality of the alarm, the number of active alarms, the number of times the alarm has been shelved, etc.

Additionally, alarm suppression functionalities may be hosted for non-ISA 18.2 compliant devices via the hosting device. Alarm suppression functionalities selectively enable a user/operator to suppress an alarm by design. Under this functionality, conditional satisfaction logic may be provided that indicates conditions where an alarm should be deactivated and/or activated. Accordingly, a user/operator may customize when an HMI and/or alarm viewer will provide notification of alarms.

Out of Service command functionalities may enable a user/operator to take an active alarm out of commission indefinitely. This may be useful, for example, when machinery monitored by the system is under maintenance. The user/operator may place any out of service alarms back in service via an In Service command. For example, an In Service command may be used once maintenance operations on a piece of machinery have completed.

Figure 1:
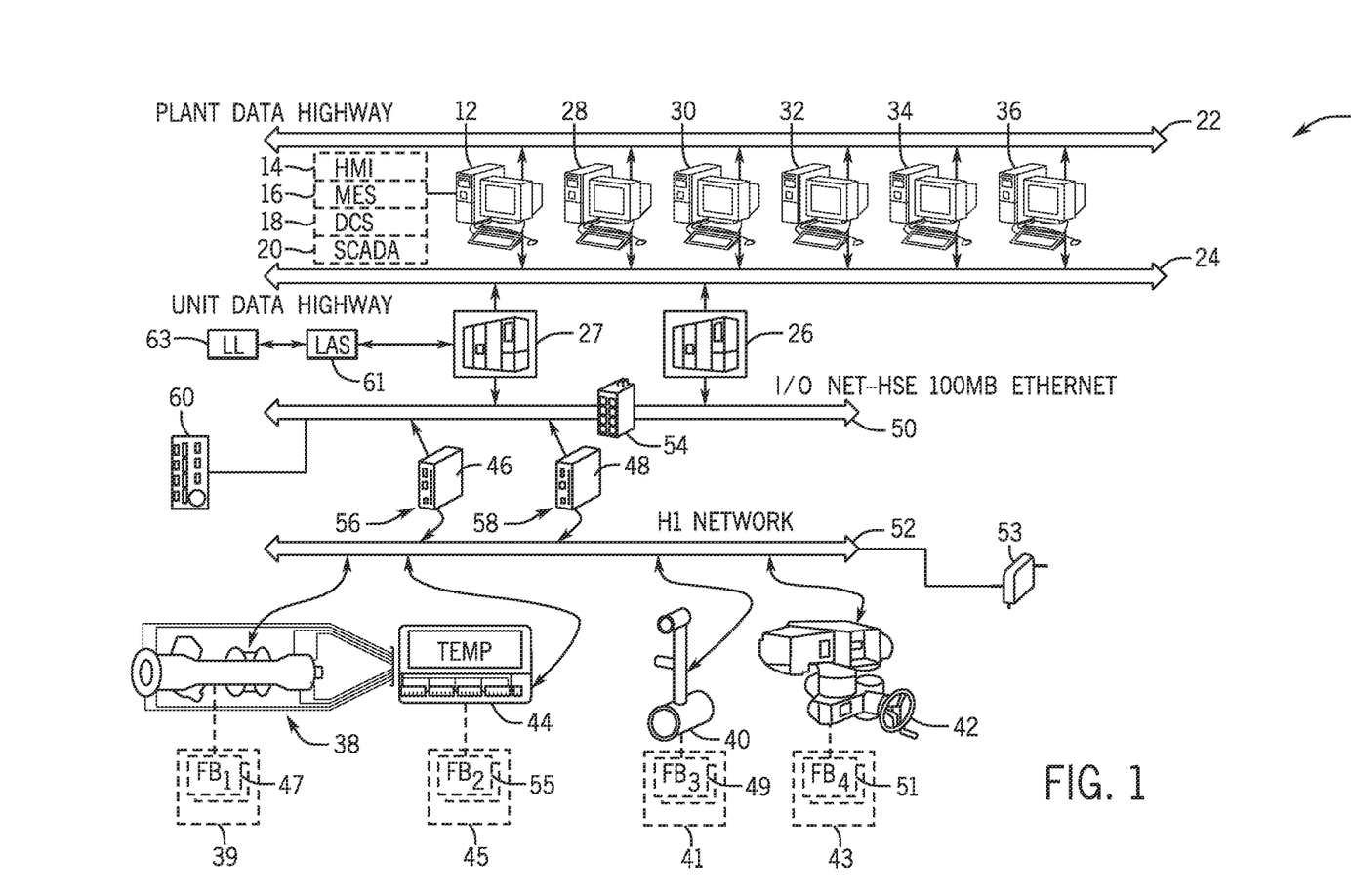
FIG. 1 is a schematic diagram of an embodiment of an automation control system (e.g., an industrial control system), including a hosting device to implement standards functionalities, in accordance with an embodiment.

Turning to FIG. 1, an embodiment of an industrial process control system 10 is depicted. The control system 10 may include a computer 12 suitable for executing a variety of field device configuration and monitoring applications, and for providing an operator interface through which an engineer or technician may monitor the components of the control system 10. The computer 12 may be any type of computing device suitable for running software applications, such as a laptop, a workstation, a tablet computer, or a handheld portable device (e.g., personal digital assistant or cell phone). Indeed, the computer 12 may include any of a variety of hardware and/or operating system platforms. In accordance with one embodiment, the computer 12 may host an industrial control software, such as a human-machine interface (HMI) software 14, a manufacturing execution system (MES) 16, a distributed control system (DCS) 18, and/or a supervisor control and data acquisition (SCADA) system 20. For example, the computer 12 may host the ControlST™ software, available from General Electric Co., of Schenectady, N.Y.

Further, the computer 12 is communicatively connected to a plant data highway 22 suitable for enabling communication between the depicted computer 12 and other computers 12 in the plant. Indeed, the industrial control system 10 may include multiple computers 12 interconnected through the plant data highway 22. The computer 12 may be further communicatively connected to a unit data highway 24, suitable for communicatively coupling the computer 12 to industrial controllers 26. The system 10 may include other computers coupled to the plant data highway 22 and/or the unit data highway 24. For example, embodiments of the system 10 may include a computer 28 that executes a virtual controller, a computer 30 that hosts an Ethernet Global Data (EGD) configuration server, an Object Linking and Embedding for Process Control (OPC) Data Access (DA) server, an alarm server, or a combination thereof, a computer 32 hosting a General Electric Device System Standard Message (GSM) server, a computer 34 hosting an OPC Alarm and Events (AE) server, and a computer 36 hosting an alarm viewer. Other computers coupled to the plant data highway 22 and/or the unit data highway 24 may include computers hosting Cimplicity™, ControlST™, and ToolboxST™, available from General Electric Co., of Schenectady, N.Y.

The system 10 may include any number and suitable configuration of industrial controllers 26. For example, in some embodiments the system 10 may include one industrial controller 26, two industrial controllers 26, three, or more industrial controllers for redundancy. The industrial controllers 26 may enable control logic useful in automating a variety of plant equipment, such as a turbine system 38, a valve 40, and a pump 42. Indeed, the industrial controllers 26 may communicate with a variety of devices, including but not limited to temperature sensors 44, flow meters, pH sensors, temperature sensors, vibration sensors, clearance sensors (e.g., measuring distances between a rotating component and a stationary component), and pressure sensors. The industrial controller 26 may further communicate with electric actuators, switches (e.g., Hall switches, solenoid switches, relay switches, limit switches), and so forth.

As will be discussed in more detail below, one or more of the controllers 26 may include logic (e.g., machine-readable instructions, stored on a non-transitory, machine-readable medium) that may act as a host for standard functionalities (e.g., ISA 18.2 alarm management functionalities) for devices (e.g., devices 38, 40, 42, and/or 44) that cannot independently implement these functionalities. Further, although the hosting of standard functionalities is described as taking place at the controllers 26 herein, this is not meant to limit the implementation of these hosting capabilities. The standard function host may reside in any other portion of the system 10. For example, the standard function host may be a standalone computer that resides between the devices that do not independently support the standard functions and the alarm server 70. Further, the standard function host may be implemented on any processing circuitry (e.g., the linking device 46 and/or 48) between the devices and the alarm server 70.

In the depicted embodiment, the turbine system 38, the valve 40, the pump 42, and the temperature sensor 44 are communicatively interlinked to the automation controller 26 by using linking devices 46 and 48 suitable for interfacing between an I/O NET 50 and a H1 network 52. For example, the linking devices 46 and 48 may include the FG-100 linking device, available from Softing AG, of Haar, Germany. In some embodiments, a linking device, such as the linking device 48, may be coupled to the I/O NET through a switch 54. In such an embodiment, other components coupled to the I/O NET 50, such as one of the industrial controllers 26, may also be coupled to the switch 54. Accordingly, data transmitted and received through the I/O NET 50, such as a 100 Megabit (MB) high speed Ethernet (HSE) network, may in turn be transmitted and received by the H1 network 52, such as a 31.25 kilobit/sec network. That is, the linking devices 46 and 48 may act as bridges between the I/O Net 50 and the H1 network 52.

A variety of devices may be linked to the industrial controller 26 and to the computer 12. For example, the devices, such as the turbine system 38, the valve 40, the pump 42, and the temperature sensor 44, may include industrial devices, such as Foundation Fieldbus devices that include support for the Foundation H1 bi-directional communications protocol. In such an embodiment, a Foundation Fieldbus power supply 53, such as a Phoenix Contact Fieldbus Power Supply available from Phoenix Contact of Middletown, Pa., may also be coupled to the H1 network 52 and may be coupled to a power source, such as AC or DC power. The power supply 53 may be suitable for providing power to the devices 38, 40, 42, and 44, as well as for enabling communications between the devices 38, 40, 42, and 44. Advantageously, the H1 network 52 may carry both power and communications signals (e.g., alert signals) over the same wiring, with minimal communicative interference. The devices 38, 40, 42, and 44 may also include support for other communication protocols, such as those included in the HART® Communications Foundation (HCF) protocol, and the Profibus Nutzer Organization e.V. (PNO) protocol.

Each of the linking devices 46 and 48 may include one or more segment ports 56 and 58 useful in segmenting the H1 network 52. For example, the linking device 46 may use the segment port 56 to communicatively couple with the devices 38 and 44, while the linking device 48 may use the segment port 58 to communicatively couple with the devices 40 and 42. Distributing the input/output between the devices 38, 44, 40, and 42 by using, for example, the segment ports 56 and 58 may enable a physical separation useful in maintaining fault tolerance, redundancy, and improving communications time. In some embodiments, additional devices may be coupled to the I/O NET 50. For example, in one embodiment an I/O pack 60 may be coupled to the I/O NET 50. The I/O pack 60 may provide for the attachment of additional sensors and actuators to the system 10.

Figure 2:
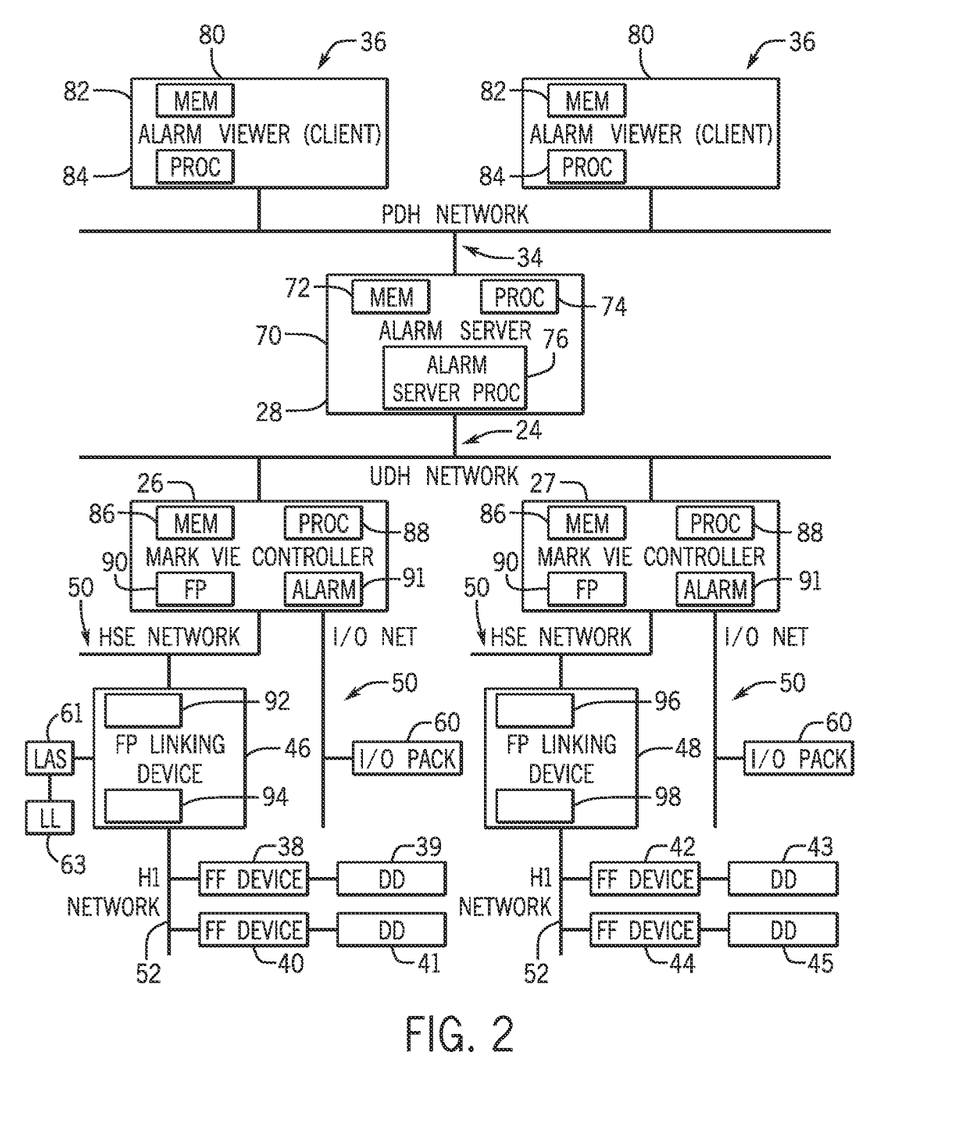
FIG. 2 is a block diagram including embodiments of various components of the industrial control system of FIG. 1, in accordance with an embodiment.

In certain embodiments, the devices 38, 40, 42, and 44 may provide data, such as alerts and/or alarms, to the system 10. These alerts may be handled in accordance with the embodiments described below. FIG. 2 depicts a block diagram of an embodiment of the industrial process control system 10 depicting various components in further detail. As described above, the system 10 may include an alarm server 70, executed on the computer 28, coupled to the plant data highway 22 and the unit data highway 24. The computer 28 may include a memory 72, such as non-volatile memory and volatile memory, and a processor 74, to facilitate execution of the alarm server 70. The alarm server 70 may execute an alarm server process 76 for receiving, processing, and responding to alarms received from the controllers 26. Multiple controllers, such as the controllers 26, may be set up for redundant operations.

The system 10 may include additional computers 36 coupled to the plant data highway 22 that may execute alarm viewers 80. The alarm viewers 80 may enable a user to view and interact with the alarms processed by the alarm server 70. The computers 36 may each include a memory 82 and a processor 84 for executing the alarm viewer 80. Additionally, in some embodiments, the alarm viewers 80 may be executed on the computer 28 or any of the computers described above in FIG. 1. The alarm server 70 may communicate with the alarm viewers 80 using any suitable alarm data protocol interpretable by the alarm viewers 80.

As described above, the controllers 26 are coupled to the unit data highway 24, and the controllers 26 may communicate with the alarm server 70 over the unit data highway 24. For example, in one embodiment, the controllers 26 and alarm server 70 may communicate using a serial data interface (SDI) alarm protocol. The controllers 26 may each include a memory 86 and a processor 88 for executing the functions of the controllers 26. In one embodiment, the controllers 26 may execute a Fieldbus process 90 and an alarm process 91. The Fieldbus process 90 may be used to interface with the field devices 38, 40, 42, and 44 while the alarm process 91 may be used to provide for a centralized facility suitable for distributing alarm information. As mentioned above, the controllers 26 may be coupled to the I/O pack 60 over the I/O NET 50. In one embodiment, the I/O pack 60 may communicate with the controllers 26 using the advanced digital logic (ADL) protocol.

As also described above, the controllers 26 may be coupled to linking devices 46 and 48 through an I/O NET 50. The linking devices 46 and 48 may communicate with the controllers 26 over the I/O NET 50. The linking devices 46 and 48 may also be coupled to the H1 network 52, and one linking device 46 may be coupled to devices 38 and 44 and another linking device 48 may be coupled to devices 40 and 42. The linking device 46 may include a memory 92, such as volatile and non-volatile memory, and a processor 94, and the linking device 48 may include a memory 96, such as volatile and non-volatile memory, and a processor 98. In one embodiment, the linking devices 46 and 48 may communicate with the controllers 26 using the Foundation Fieldbus protocol.

The system 10 may enable alert and diagnostic information to be communicated from the various devices to a user, such as through the HMI 14 and the alarm viewers 80. For example, the Foundation Fieldbus devices 38, 40, 42, and 44 may provide an alert to the controller 26. The alert may be provided from the controller 26 to the alarm server 70, which may process the alert and provide information to the HMI 14, the alarm viewers 80, or any other computers coupled to the unit data highway 24 or plant data highway 22.

As such, the Foundation Fieldbus standard relies on Foundation Fieldbus alerts, which are used by Foundation Fieldbus devices (e.g., devices 38, 40, 42, and 44) to communicate to the system controllers (e.g., controller 26) alarms and diagnostic information regarding the status of the devices. The Foundation Fieldbus alerts provided from Foundation Fieldbus devices include one or more parameters that provide information about the alerts. However, some components of the industrial control system 10 may also comply with the other standards (e.g., the ISA 18.2 alarm management standards) that certain devices (e.g., Foundation Fieldbus devices 38, 40, 42, and 44) may not be able to independently comply with. Accordingly, as will be described in more detail below, a hosting device (e.g., one or more of the controllers 26) may be configured to host standard functionalities (functionalities defined by the standard), such as prioritization, shelving, alarm suppression, etc. that these devices that do not independently support the standard functionalities.

Figure 3:
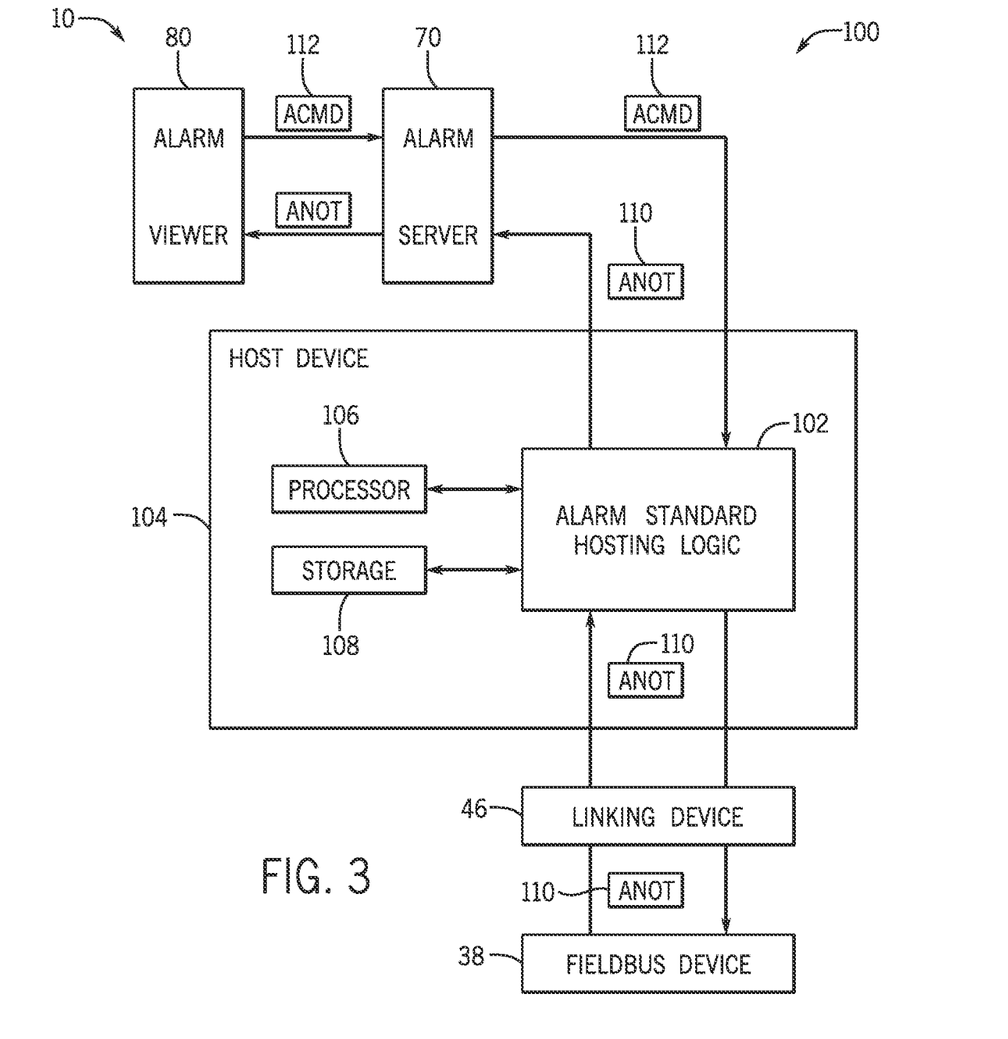
FIG. 3 is a block diagram illustrating data flow between various components of the industrial control system of FIGS. 1 and 2, in accordance with an embodiment.

Having discussed the basics of the standard function hosting logic (e.g., the logic that hosts the functions of the standard to be implemented), FIG. 3 is a block diagram 100 illustrating data flow between the alarm systems (e.g., alarm server 70 and alarm viewer 80), the standard function hosting logic 102, and the non-compliant device (e.g., Foundation Fieldbus device 38) of the industrial control system 10 of FIG. 1. As mentioned above, the standard function hosting logic 102 may reside as computer-implemented instructions in one or more components of the system 10. For example, the logic 102 may be implemented by a standalone hosting device 104 that includes one or more processors 106 and machine-readable storage 108 useful for implementing the standard function hosting logic 102. In alternative embodiments, the host device 104 may consist of standard function hosting logic residing on other processing components, such as a controller of the system 10.

A user/operator of the system 10 may initiate standard functionalities on one or more alarm notifications 110 that are provided by non-compliant devices (e.g., device 38). For example, the Foundation Fieldbus device 38 may not be configured to adhere to an ISA 18.2 standard functionality, such as alarm prioritization, alarm shelving, alarm suppression, and/or service commands that place alarms in or out of service. Accordingly, the host device 104 may provide hosting of these functionalities for non-compliant devices. As a non-compliant device (e.g., device 38) triggers an alarm, an alarm notification 110 is provided to the host device 104 (e.g., via the linking device 46). In some embodiments, the alarm notification 110 will pass through the host device 104 directly to the alarm server 70, ultimately being displayed at the alarm viewer 80. As will be discussed in more detail with regards to FIG. 5, the alarm viewer 80 may be configured with a graphical user interface (GUI) that enables implementation/control of the standard function logic 102 on alarms sent by the non-compliant devices (e.g., device 38). For example, the user/operator may trigger an alarm command 112, which may be provided to the standard hosting logic 102 (e.g., via the alarm server 70). As will be described in more detail below with regard to FIGS. 4 and 7, the standard functionality hosting logic 102 may implement the standard functionalities (e.g., shelving, alarm suppression, out of service commands, etc.) by monitoring alarms and selectively providing the alarms to the alarm server 70 and alarm viewer 80 based upon the rules in the logic 102.

Figure 4:
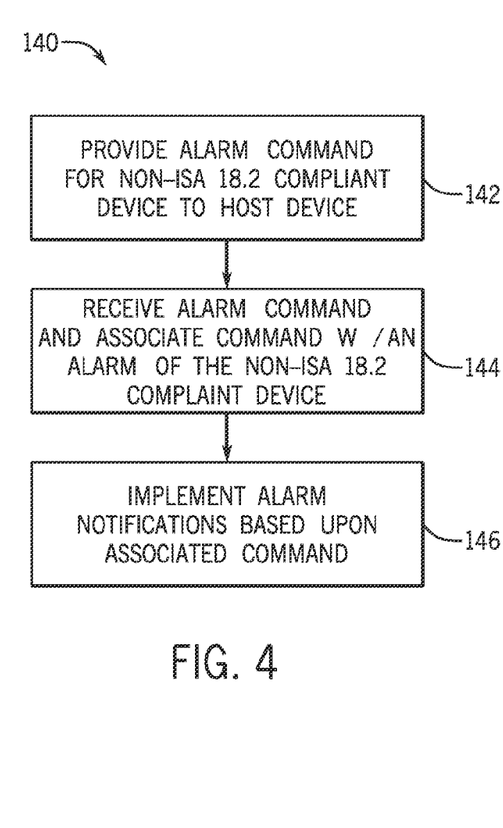
FIG. 4 is a flowchart illustrating a process for implementing rule-based standards on non-compliant devices, in accordance with an embodiment.
Figure 5:
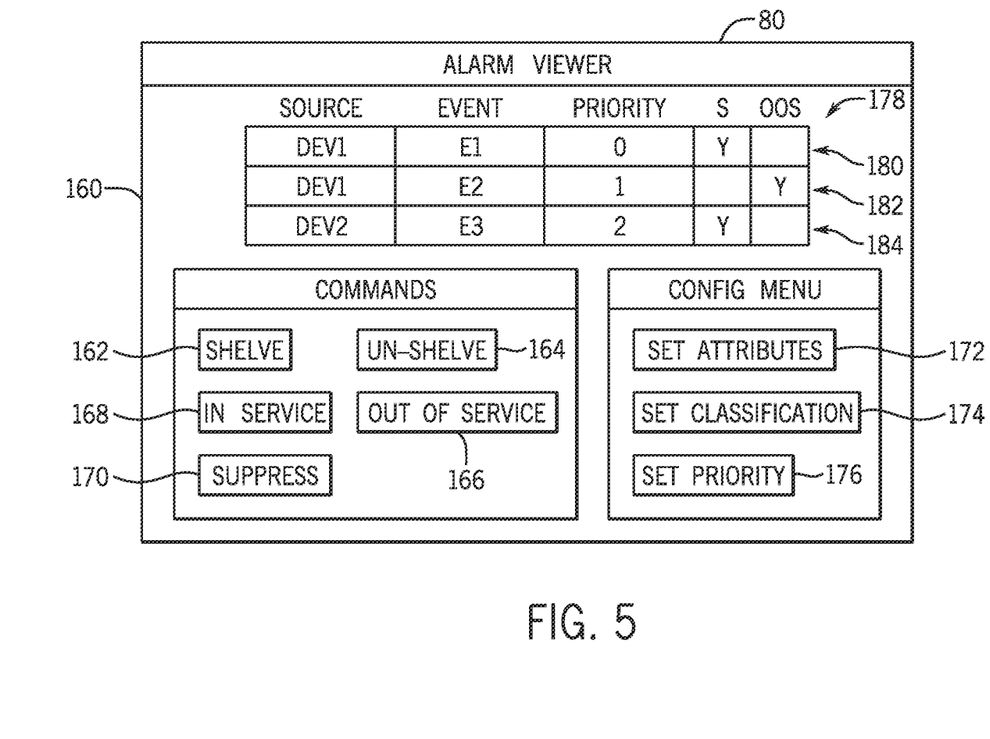
FIG. 5 is a simplified graphical user interface (GUI) that may be used to implement the process of FIG. 4, in accordance with an embodiment.
Figure 6:
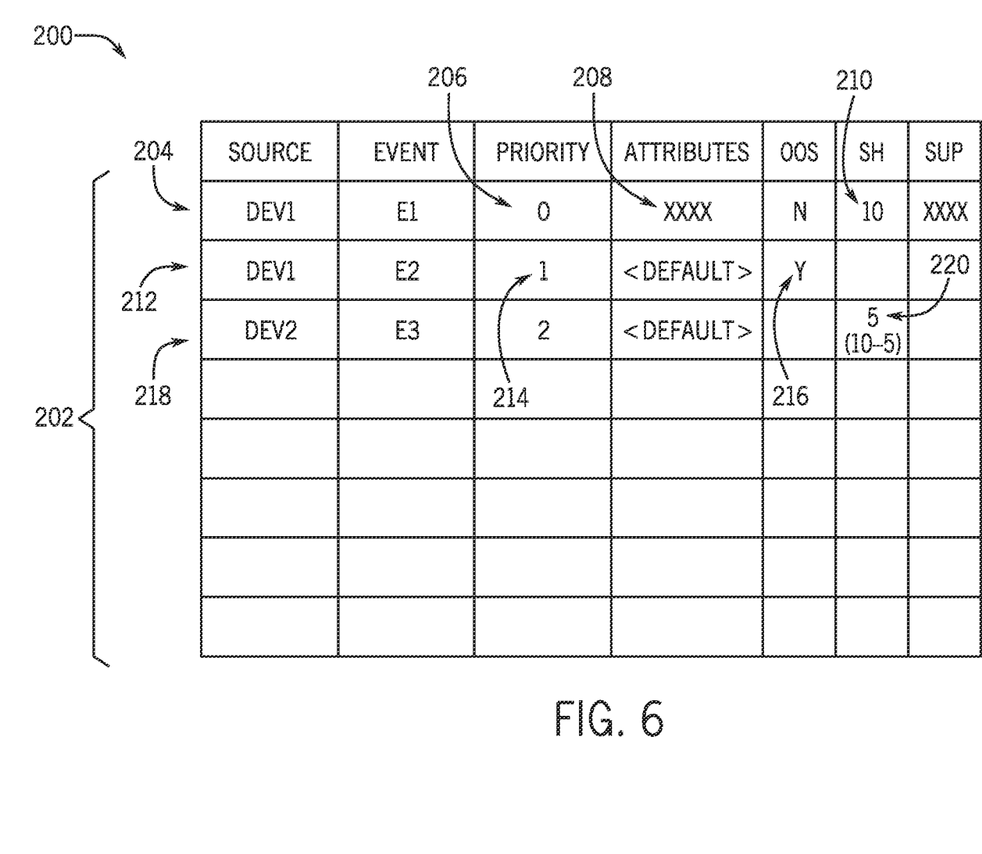
FIG. 6 is an example of a resultant data store after implementing the process of FIG. 4 using commands supplied by the GUI of FIG. 5, in accordance with an embodiment.

FIG. 4 is a flowchart illustrating a process 140 for implementing rule-based standards on non-compliant devices (e.g., devices that do not support one or more of the functionalities of a standard), as defined by the logic 102 of FIG. 3. Further, FIG. 5 is a simplified graphical user interface (GUI) 160 that may be used to implement the process 140 of FIG. 4, in accordance with an embodiment. FIG. 6 illustrates an example of a resultant data store 200 after implementing the process of FIG. 4 using commands supplied by the GUI of FIG. 5, in accordance with an embodiment. Because the process 140 may be initiated via the GUI 160 (e.g., implemented here on the alarm viewer 80) and the resultant data store is provided based upon commands implemented from the GUI 160, FIGS. 4-6 will be discussed together.

The discussion of GUI 160 and data store 200 is meant to provide basic examples of the current embodiments. The discussion is in no way meant to limit the conceivable variations of implementing the features described herein. For example, as one of ordinary skill in the art would recognize, the GUI 160 could be represented in a multitude of manners. Further, the data store 200, while presented as a simplistic data table, could be implemented as multiple data tables, as memory objects, etc.

First, to initiate or control functionalities defined by the standard to be implemented on the non-compliant device, an alarm command may be generated via the GUI 160 and provided to the hosting device (e.g., hosting device 104 of FIG. 3) (block 142). For example, as depicted in the GUI 160, commands may include a shelve command 162, an un-shelve command 164, an out of service command 166, an in service command 168, a suppression command 170, and configuration options for setting attributes 172, setting alarm classifications 174, and/or setting alarm priorities 176. Further, a listing of alarms 178 may be presented, which provides an indication of current alarm status.

Using a simple example, an alarm command shelving alarms "E1" sourced from "DEV 1" may be generated via the GUI 160 by first selecting the "DEV 1" "E1" row 180 and then selecting the shelve option 162. Further, alarm suppression conditions may be attributed to the "E1" alarms sourced from "DEV 1" by selecting row 180, selecting the suppress option 170, and then inputting conditional logic for suppression of the alarm represented by row 180.

Further, an alarm command setting a priority and other attributes for particular alarms may be generated. For example, "E1" alarms sourced by "DEV 1" may be set to "0" by selecting row 180, selecting the set priority option 176, and then entering the priority value of "0." Additionally, attributes for these alarms may be set by selecting the set attributes option 172 and entering further attribute information (e.g., a description of the alarm, an alarm name, etc.). Further, "E2" alarms sourced by "DEV 1" may be set by selecting row 182 and then selecting the set priority option 176, and then inputting a particular priority value (e.g., "1").

The hosting device may receive the generated alarm command and associate the command with an alarm that may be triggered by the non-compliant device (e.g., the device that cannot independently implement the standard functions) (block 144). For example, as illustrated in FIG. 6, the resultant data store 200 may include one or more rows 202 that associate conditions/rules with alarms that may be triggered.

For example, in accordance with the exemplary generated alarm commands discussed above, resultant row 204 includes a condition 206 indicating that "E1" alarms sourced from "DEV 1" have a priority of "0", a condition 208 indicating specified attributes of these alarms, a shelving timing condition 210 indicating that the alarm is shelved for an increment of 10 timing units (e.g., minutes or seconds). Further, resultant row 212 includes conditions for "E2" alarms sourced from "DEV 1" including a priority indicator condition 214 indicating a priority of 1 for these alarms and an out of service condition 216 indicating that the alarm has been placed out of service. Resultant row 218 includes a shelving timing condition 220, indicating that there are 5 timing units left of shelving. For example, if the shelving time is fixed at 10 seconds and 5 seconds have already passed, 5 seconds of shelving remain. As discussed above, while alarms are shelved, the user/operator is not actively notified of the alarm (or the alarm notification is presented in a shelved alarms section rather than the active alarms section).

Figure 7:
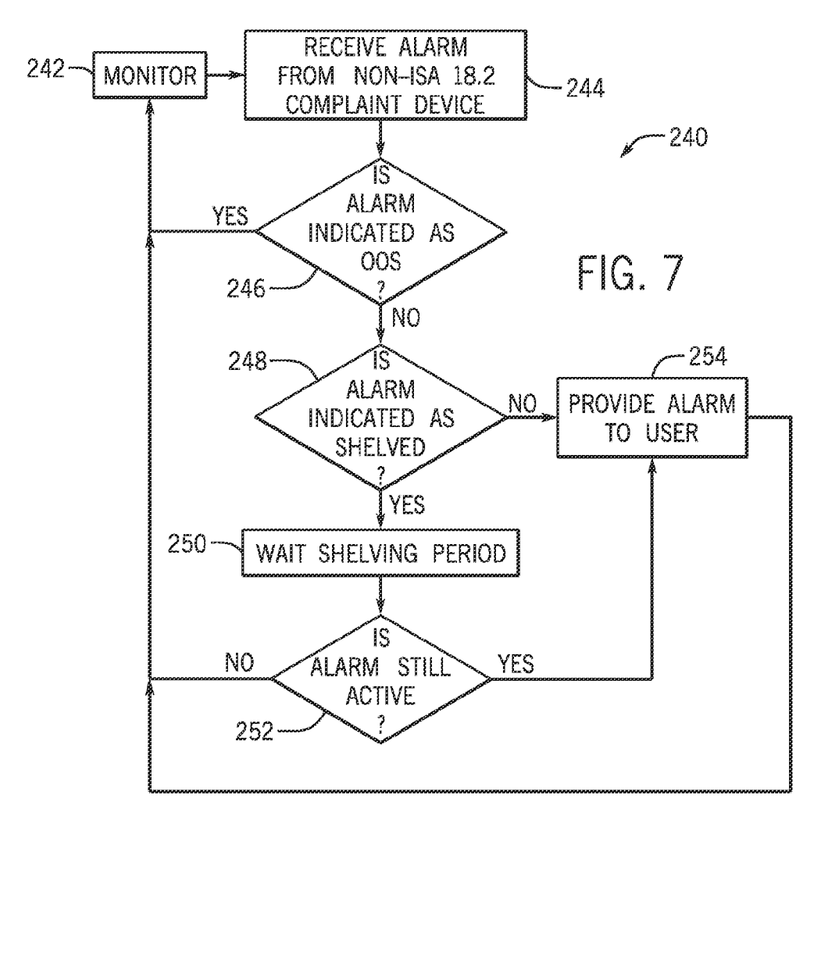
FIG. 7 is a flowchart illustrating a process for implementing the rules defined by the resultant data store of FIG. 6, in accordance with an embodiment.

Once the commands have been associated with the alarms, the standard function host may implement the alarm notifications based upon the association (block 146). For example, FIG. 7 is a flowchart illustrating a process 240 for implementing the rules defined by the resultant data store 200 of FIG. 6, in accordance with an embodiment. The process 240 begins by monitoring the non-compliant devices for alarm notifications (block 242). For example, upon certain events occurring, the device (e.g., device 38 of FIG. 3) may trigger an alarm notification (e.g., alarm notification 110 of FIG. 3). Even though the device may not comply with certain functions of a given standard, the hosting device 104 described in FIG. 3 may be used to implement the standard functionalities for the device. To do so, the notification is first received from the non-compliant device (block 244). Next, the data store with associated conditions (e.g., resultant data store 200 of FIG. 6) is referenced to determine if conditions have been applied to the received alarm. For example, at decision block 246, it is determined whether the received alarm has been placed out of service. If it has, monitoring 242 continues without notifying the user/operator. For example, using the resultant data store 200 example, no notification would be presented for "E2" alarms sourced from "DEV 1," as these alarms are indicated as shelved (e.g., via condition 216).

If an alarm is not indicated as out of service, it is determined whether the received alarm is currently shelved (decision block 248). If the alarm is shelved (e.g., "E1" alarms sourced by "DEV 1" or "E3" alarms sourced by "DEV 2" in the resultant data store 200), the logic waits the indicated shelving period (e.g., 10 for the "E1" alarm or 5 for the "E3" alarm) (block 250). Next, it is determined whether the alarm is still active (decision block 252). If the alarm is still active or alarm was not indicated as shelved in decision block 248, the alarm is provided to user/operator (block 254). Once the alarm has been provided to the user/operator and/or if it is determined that the alarm is not active after the shelving period has concluded, monitoring 242 continues.

As discussed above, certain embodiments may provide indications of triggered alarms in alternative windows and/or tabs for shelved and/or out of service alarms. Accordingly, the process 240 is not intended to suggest that shelved and/or out of service alarms are not provided to the user/operator via the alarm viewer. Further, the monitoring 242 for new alarm notifications may be a continuous process that may occur concurrently with the other aspects of the process 240. The current process 240 is not intended to suggest that monitoring for additional alarm notifications is limited to waiting the shelving period.

Technical effects of the invention include hosting rule-based standard behaviors from a hosting device. Specifically, prioritization, shelving, suppression, and out of service functionalities may be provided by a hosting device. Thus, devices that are not independently compliant with these standards may react in a consistent manner as those devices that are independently compliant. Accordingly, the industrial control system may benefit from increased consistency, by implementing best practices defined by the standards, across all/more devices of the system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a standard functionality hosting device, comprising:
standard functionality hosting logic comprising machine-readable instructions stored on a tangible, non-transitory machine-readable medium configured to implement, control, or implement and control management functionalities comprising alarm prioritization, alarm shelving, alarm out of service functionality, or any combination thereof defined by a standard, for one or more devices that are not independently enabled to implement, control, or implement and control the management functionalities;
a processor configured to implement the alarm standard hosting logic;
wherein the standard functionality hosting logic is configured to:
monitor the one or more devices for alarms;
receive an alarm from the one or more devices;
determine whether the alarm has been set as out of service or shelved by the standard functionality hosting logic;
disable or otherwise differentiate presentation of the alarm if the alarm is set as out of service;
disable or otherwise differentiate presentation of the alarm if the alarm is set as shelved and a shelving time period has not elapsed; and
present the alarm normally if the alarm is not set as out of service, shelved, or if the shelving time period has elapsed.

* * * * *